US010225483B1

(12) United States Patent
Hong et al.

(10) Patent No.: US 10,225,483 B1
(45) Date of Patent: Mar. 5, 2019

(54) METHOD AND SYSTEM FOR PROJECTING IMAGE WITH DIFFERING EXPOSURE TIMES

(71) Applicant: Pierce Biotechnology, Inc., Rockford, IL (US)

(72) Inventors: Suk J. Hong, Roscoe, IL (US); Nikki L. Jarrett, Roscoe, IL (US); Eric Leigh Hommema, Roscoe, IL (US); Jason Aravich, Pittsburgh, PA (US)

(73) Assignee: PIERCE BIOTECHNOLOGY, INC., Rockford, IL (US)

(*) Notice: Subject to any disclaimer, the term of this patent is extended or adjusted under 35 U.S.C. 154(b) by 630 days.

(21) Appl. No.: 14/264,150

(22) Filed: Apr. 29, 2014

Related U.S. Application Data

(60) Provisional application No. 61/818,107, filed on May 1, 2013.

(51) Int. Cl.
*G06K 9/46* (2006.01)
*H04N 5/235* (2006.01)
*G06T 7/00* (2017.01)

(52) U.S. Cl.
CPC ......... *H04N 5/2353* (2013.01); *G06T 7/0012* (2013.01); *G06T 7/0081* (2013.01); *G06T 7/0085* (2013.01); *H04N 5/2351* (2013.01); *G06T 2207/10144* (2013.01); *G06T 2207/20144* (2013.01); *G06T 2207/30072* (2013.01)

(58) Field of Classification Search
CPC . H04N 5/2353; H04N 5/2355; G03F 7/70275
See application file for complete search history.

(56) References Cited

U.S. PATENT DOCUMENTS

| 5,585,942 | A | 12/1996 | Kondo |
| 5,734,426 | A | 3/1998 | Dong |
| 5,751,352 | A | 5/1998 | Ogawa |
| 6,665,010 | B1 | 12/2003 | Morris |
| 7,292,280 | B2 | 11/2007 | Yamazaki et al. |
| 7,304,683 | B2 | 12/2007 | Motta |
| 7,646,407 | B2 | 1/2010 | Fossum et al. |
| 7,728,897 | B2 | 6/2010 | Milkov et al. |
| 7,897,902 | B2 | 3/2011 | Katzir et al. |
| 8,040,394 | B2 | 10/2011 | Fossum et al. |
| 2005/0104615 | A1* | 5/2005 | Kim ................ G02F 1/167 356/237.1 |
| 2007/0237514 | A1* | 10/2007 | Pillman ............ G03B 7/00 396/153 |
| 2010/0136549 | A1* | 6/2010 | Christiansen ...... G06T 7/0012 435/6.1 |
| 2010/0177221 | A1* | 7/2010 | Lee ................ H01L 27/14603 348/262 |
| 2010/0321484 | A1* | 12/2010 | Kishima ............ G01N 21/6458 348/79 |

(Continued)

*Primary Examiner* — Zhubing Ren

(57) ABSTRACT

A method for creating a projected image including capturing an image of an item or data relating to an image of an item with an image capture device having a plurality of light sensing units, at a first exposure time. The method further includes receiving as an input or determining a second exposure time, and creating a projected image of the item at the second exposure time based upon the captured image or the captured data relating to the image.

19 Claims, 8 Drawing Sheets
(6 of 8 Drawing Sheet(s) Filed in Color)

(56) References Cited

U.S. PATENT DOCUMENTS

2011/0013064 A1* 1/2011 Lahav .................... H04N 5/335
348/296
2012/0276555 A1* 11/2012 Kuhn ................. G01N 33/5076
435/7.23

* cited by examiner

Estimation of 10 minute exposure

METHOD AND SYSTEM FOR PROJECTING IMAGE WITH DIFFERING EXPOSURE TIMES

RELATED APPLICATIONS

This applications claims priority to U.S. application Ser. No. 61/818,107 filed May 1, 2013 which is expressly incorporated by reference herein in its entirety.

A method and system for projecting an image with differing exposure times, such as for use with images generated from a charge coupled device (CCD) or the like.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Figure 1:
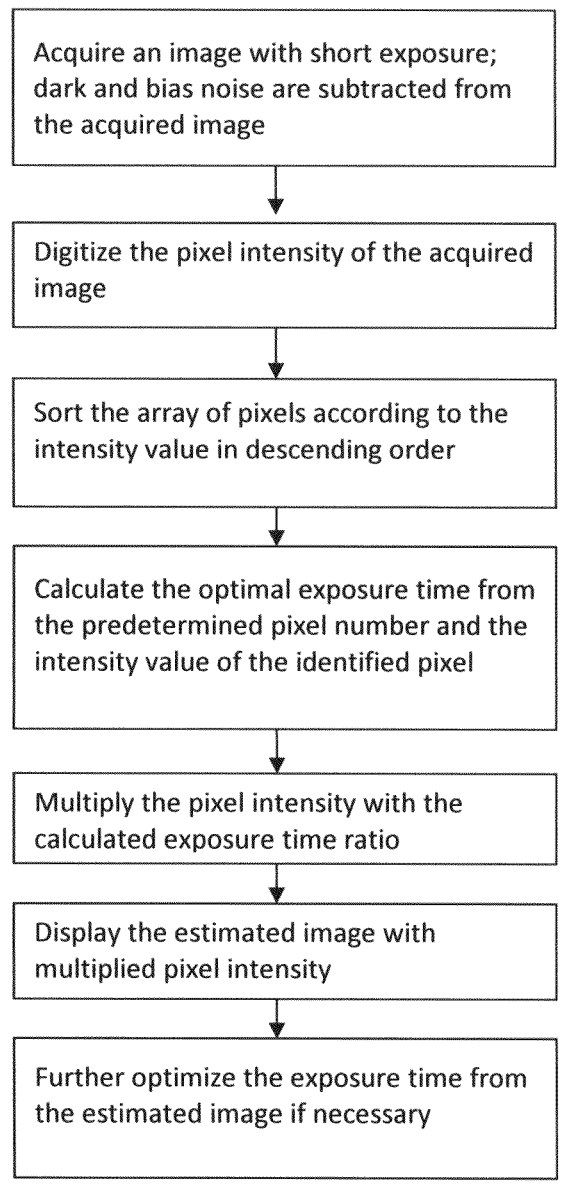
FIG. 1 is a flowchart showing one embodiment of the method and system.

Life science researchers routinely obtain images of mixtures of macromolecules, such as DNA, RNA and proteins, and their fragments, from stained gel electrophoresis samples and Western blots. The images are then captured and analyzed to obtain data.

In order to separate the complex mixtures using electrophoresis, several samples containing the mixture are applied to separate, spaced apart locations on the electrophoresis gel. An electrical current is then applied to the gel, which causes the individual samples to migrate through the gel within their prescribed lane or track, thereby generating an invisible lane on the gel. The complex mixture is then separated by size, i.e., molecular weight, and net charge in the gel matrix. The larger, higher molecular weight with low net charge molecules remain relatively nearer the place of sample loading on the gel or membrane. The smaller, lower molecular weight molecules with high net charge migrate farther from the sample loading place of the gel or membrane. Each individual segregation of sample is then identified as a band. The gel can then be stained for total sample visualization, or transferred to a membrane for visualization of a specific target of interest by blotting (Western blotting in the case of proteins, Southern blotting in the case of DNA, and Northern blotting in the case of RNA). The researcher then images the gel, membrane or blot, collectively termed a substrate or object, to analyze the target(s) of interest for amount, relative or absolute, purity, and molecular weight. Such analysis requires detection and identification of the lanes and bands in the image.

The images of the object are typically acquired using one or more visualization means, such as ultra violet light illumination, white light illumination, fluorescence, or chemiluminescence.

Finding proper exposure time is an important factor affecting image quality and it is important for successful, accurate pixel intensity measurement on the acquired image. Various auto exposure methods have been developed, but those methods are either complex, inaccurate and/or disregard user input. Optimal exposure time for image capture is not always dependent on pixel intensity of the entire image or any particular region of the image. In some cases, the user/operator can best define which object(s) on the captured image should be the target for optimal exposure determination.

Images of the substrate, or of other objects, can be captured by any of a wide variety of structures or devices, but in one case takes the form of an imaging device or image capture device utilizing/comprising a CCD (Charge Coupled Device), but can also be used with autoradiography, scanners, CMOS (Complementary Metal Oxide Semiconductor) imagers, phosphor imagers, and others. In the case of the CCD, such a system utilizes an array of light-sensitive optical elements, such as pixels or other light sensing units. The pixels are configured such that when light (photons) are detected by the pixels, each pixel provides an output in the form of an electrical signal that is proportional or related to the intensity of the detected light (photons). Multiple pixels or arrays of pixels can also be combined together using the well-known binning technique, and in this case each group of binned pixels can be considered a single pixel.

Each pixel has a limited capacity for maximum light exposure, also known as its saturation point. If too many pixels reach their saturation point for a given image, the image is considered over-exposed. In contrast, if too many of the pixels receive insufficient light, the image lacks sufficient contrast and is considered under-exposed. Thus, when capturing images it is helpful to determine the optimal exposure time so that data from the image can be accurately captured. Use of the optimal exposure time maximizes the dynamic range of the pixel intensities in the image, and minimizes the number of pixels that are saturated.

In previous systems, in order to determine the proper exposure time for image acquisition, a trial-and-error image acquisition process or a complex, inaccurate automatic exposure method was utilized. The user/operator would need to carry out multiple image acquisitions with differing exposure times, compare the images, and make estimates as to the best exposure time. However this process is labor-intensive and also takes up usage of the imaging equipment that would otherwise be put to productive use.

Thus, in one embodiment the present invention provides a system and method for providing, and/or enabling a user/operator to determine the optimal exposure time for image acquisition based upon only a single image acquisition. In order to carry out this method and system, and with reference to FIG. 1, a test or preliminary image of the substrate or object is first obtained under a test, or first, exposure time. The timing/value of the test exposure time can vary as needed, and according to the specific equipment and nature of image expected to be acquired. However, the test exposure time in many cases is shorter than the normal or expected full or optimal exposure time. In one case, for example, the test exposure time is between about 10 milliseconds and about 10 minutes, or in another case between about 1 second and about 60 seconds, or more particularly between about 5 seconds and about 25 seconds, or in one case less than about 60 minutes, or in another case less than about 1 minute.

After the image (test image) at the test exposure time is acquired, noise subtraction algorithms (including accounting for dark noise, bias noise, flat field, etc.) are applied to the data/image in a well-known manner. The signal intensity, or output, of each pixel can then be arranged/ordered. The system then analyzes the number of pixels that exceed a threshold value (and/or are projected to exceed a threshold value), and uses that number to determine the optimal exposure time.

By way of example, in a 16 bit image system, the output of each pixel can be an integer ranging from 0 to 65,535. Of course, 8 bit, 32 bit, gray or color or other imaging systems can be utilized, and the output values of each pixel can therefore vary widely. The system can then analyze the number of pixels that are at saturation value (e.g. at 65,535 for a 16 bit image) or at some value close to saturation (e.g. 90% of saturation in one case, at a value at or exceeding 58,982), or some other threshold value. The system will have pre-programmed into it, or stored therein or provided thereto, a number representing the number of pixels or a percentage of pixels which should be at or above the threshold value to provide the desired/optimal image. For example, in one case it may be known that a best image can be expected to be provided if 5% of the pixels are at or near saturation or above the threshold value. Alternately, rather than considering a percentage of pixels, the system may instead analyze the raw number of pixels that are at or near saturation or above the threshold value.

Thus, in the case of a 2.1 megapixel CCD array, and continuing to use the 5% number as an example, the system may use a number of 0.105 megapixels at the cut-off which are desired to be above the threshold value. Of course, the cut-off percentage and cut-off number of pixels can vary widely depending upon the type of image desired/expected, the properties of the equipment, etc. In addition, it should be understood that rather than utilizing the cut-off number at this point, projected values for each pixel can be generated, and then a threshold is applied, and/or the optimal exposure time calculated in other manners.

As mentioned above, in addition to using a percentage of pixels that can be at or above the threshold, a raw number of pixels can be used for this purpose. To determine the raw number of pixels that can be at or above the threshold, various methods can be utilized including but not limited to: A) analyzing the number of pixels typically encompassed by an object of interest on an image at different binning levels, resolutions, etc. and/or B) analyzing the number of pixels that reach saturation at different binning levels, resolutions, etc. using the maximum exposure time when no object is imaged (i.e., background such that only uncompensated random noise is present in the image).

It can be assumed that the intensity value for each pixel will increase linearly/proportionally, or at some known non-linear rate, with respect to increased exposure time. Thus once the data for the test image is known, and the threshold value for high intensity pixels are known, the optimal exposure time for the image can be calculated. Continuing with the example set forth above and assuming a linear relationship between pixel intensity and exposure time, it can be seen that if it is desired that the image have 0.105 megapixels of its 2.1 pixels be close to saturation (at or exceeding a threshold value of 58,982), the original exposure time (say, 15 seconds) should be multiplied by a number, which needs to be determined, to provide the desired output. For example, it may be determined that if the test exposure time is increased 4 times, 0.105 megapixels of the test image will be at and/or exceed the threshold value, resulting in an optimal exposure time of 4×15 seconds, or 60 seconds.

In one case, then, the optimal exposure time can be calculated by: 1) determining the number of pixels that are desired to exceed the threshold value; 2) from the test image data conducted at a test image exposure, selecting the number of pixels, from step 1, of pixels with the greatest intensity; 3) from the group of pixels defined in step 2) selecting the pixel with the smallest intensity value; 4) dividing the intensity value from step 3) by the time of the test image exposure; and 5) dividing threshold value by the numerical result of step 4), resulting in the optimal exposure time.

By way of example, consider the following 16 bit image data from a simple eight pixel array, which represents pixel output received after a 15 second exposure time:

TABLE 1

| Pixel Number | Pixel Output |
|---|---|
| 1 | 5,000 |
| 2 | 10,000 |
| 3 | 15,000 |
| 4 | 20,000 |
| 5 | 25,000 |
| 6 | 30,000 |
| 7 | 35,000 |
| 8 | 40,000 |

In this case, let it be assumed that it is desired that 25% of the pixels exceed a cut-off value of 58,982. In this case, then, under step 1 above it is determined that two pixels, or 25% of the eight total pixels, are desired to exceed the threshold value. Under step 2 from above, the two pixels of highest intensity are selected, which are pixels number 7 and 8. Under step 3, the pixel with the smallest intensity value between pixels 7 and 8 (pixel 7) is selected. The intensity value for pixel 7 (35,000) is then divided by the test time exposure (15 seconds) resulting in a value of 2333. The cut-off value (58,982) is then divided by 2333, resulting in a value of about 25.3 seconds. 25.3 seconds can then be considered the projected optimal exposure time.

Once the optimal projected exposure time is determined, a projected image can be generated, projecting/extrapolating how the image will look based upon the test image data, and assuming that intensity varies directly with exposure time (i.e. assuming a linear, or a known non-linear relationship between intensity and exposure time). Continuing with the example above, the pixel output of Table 1 will be multiplied by 25.3/15 resulting in the following output:

| Pixel Number | Pixel Output |
|---|---|
| 1 | 8,433 |
| 2 | 16,867 |
| 3 | 25,300 |
| 4 | 33,733 |
| 5 | 42,167 |
| 6 | 50,600 |
| 7 | 59,033 |
| 8 | 65,535* (67,466) |

*In this example, values that exceed the maximum intensity for a pixel (65,535) are assigned the maximum intensity value (16 bit image)

In this case, then, it can be seen that 25% of the pixels exceed the pixel threshold of 58,982, as desired. Of course, there are a wide variety of mathematical methods and algorithms and pixel math techniques that can be utilized to determine an exposure time that is projected to provide a minimum number/percentage of pixels that exceed a threshold value, and the technique outlined above is simply one example. The system and method specified and claimed herein is not limited the specific technique shown above. In any case, once the projected optimal exposure time image is calculated, the projected image can be generated and presented to the user/operator.

Figure 2:
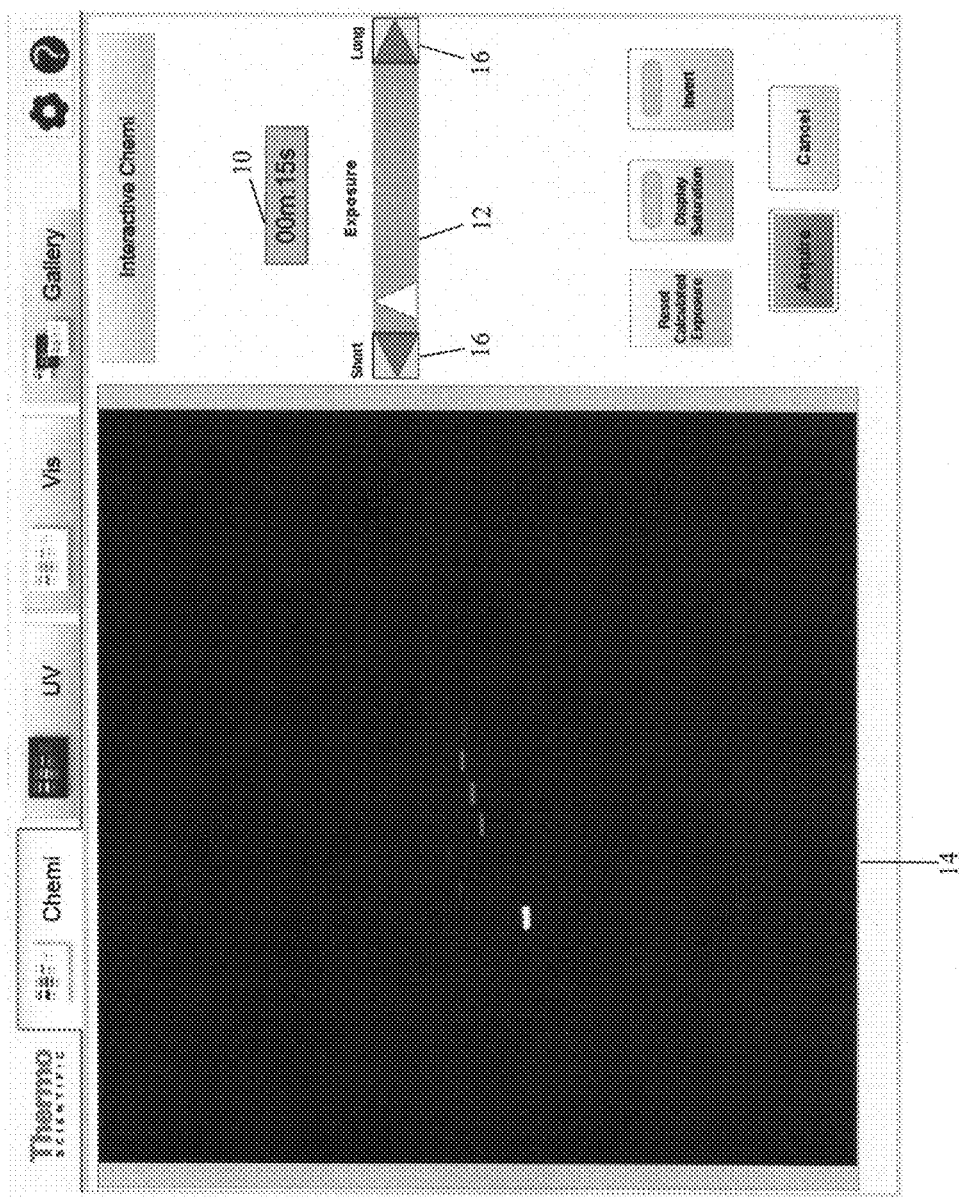
FIG. 2 is an image of an object at an initial exposure time.
Figure 3:
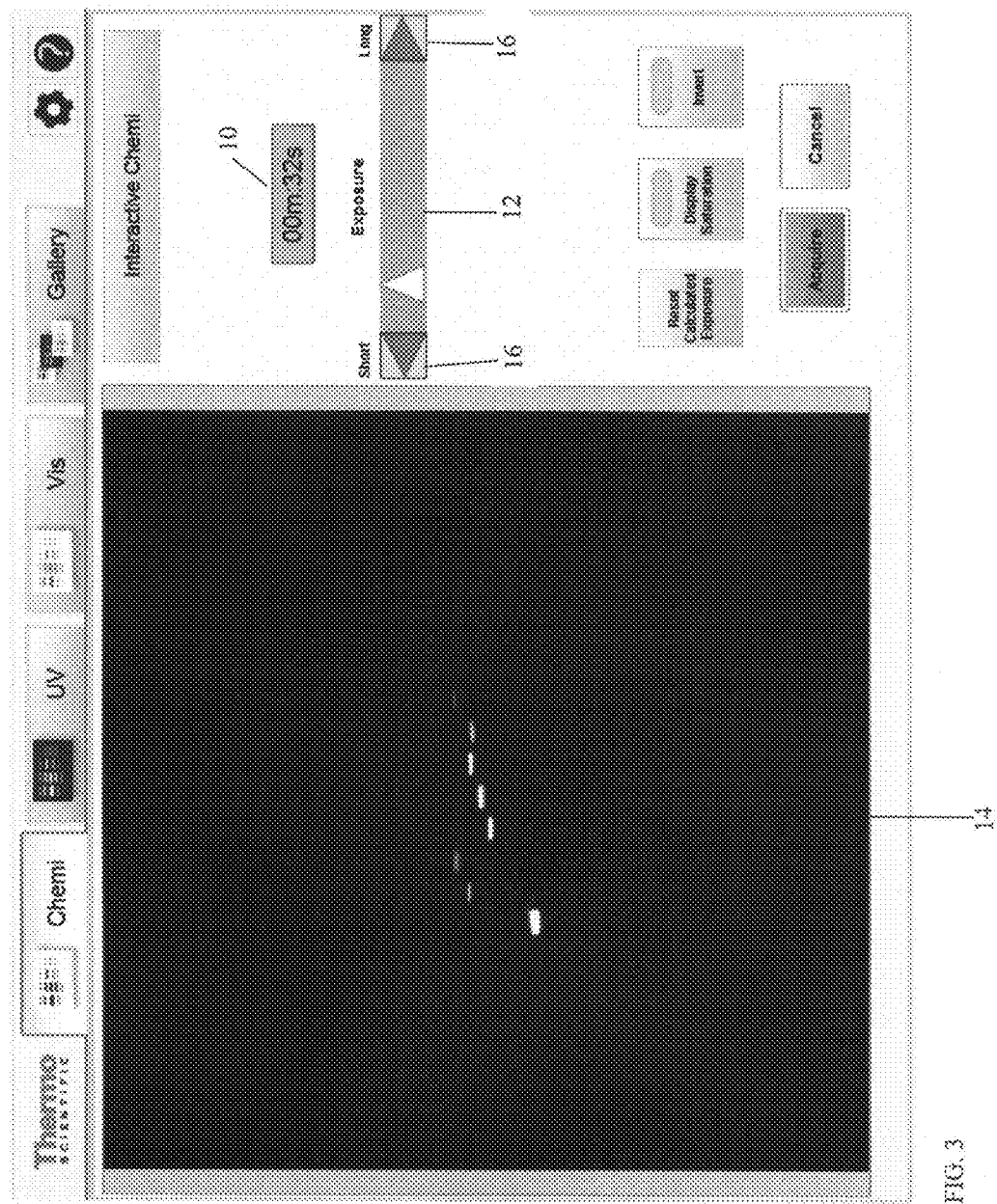
FIG. 3 is a projected image of the object of FIG. 2 at an exposure time calculated to be optimal.

FIG. 2 illustrates one example of a test image at a test exposure of ten seconds in the illustrated embodiment, as shown in the exposure time display 10. In this figure the image is slightly underexposed. The calculations outlined above can be applied to the image/image data of FIG. 2, resulting in a projected optimal exposure time of 17 seconds. FIG. 3, then, shows an image based upon the data/image of FIG. 2 as presented to a user at a projected optimal exposure time, or a second exposure time. In this case the projected optimal exposure time is 17 seconds, as calculated by the system in the manner outlined above.

The system may also provide the option to a user to manually adjust the exposure time (i.e. via a user input device, resulting in a third or user-created exposure time), and the system can adjust the projected image accordingly. In other words, each pixel output can be adjusted in a manner directly proportional to the input exposure time to present an image to the user/operator, so that the user/operator can see how the image is projected to look at a user-defined exposure time. In the illustrated embodiment, the input device takes the form of slider bar 12 that can be adjusted by a user via a cursor control device of the like. In one case, the projected image 14 is displayed in real time to match the position of the slider bar 12 as it is moved so that the user/operator is provided with instantaneous feedback.

When the slider bar 12 is utilized, the numerical value of the exposure time is displayed in the exposure time display 10. Alternately, or in addition, the user/operator may be able to directly enter the numerical value of the desired exposure time to be displayed, or control the numerical values with navigation buttons 16, etc.

Figure 4:
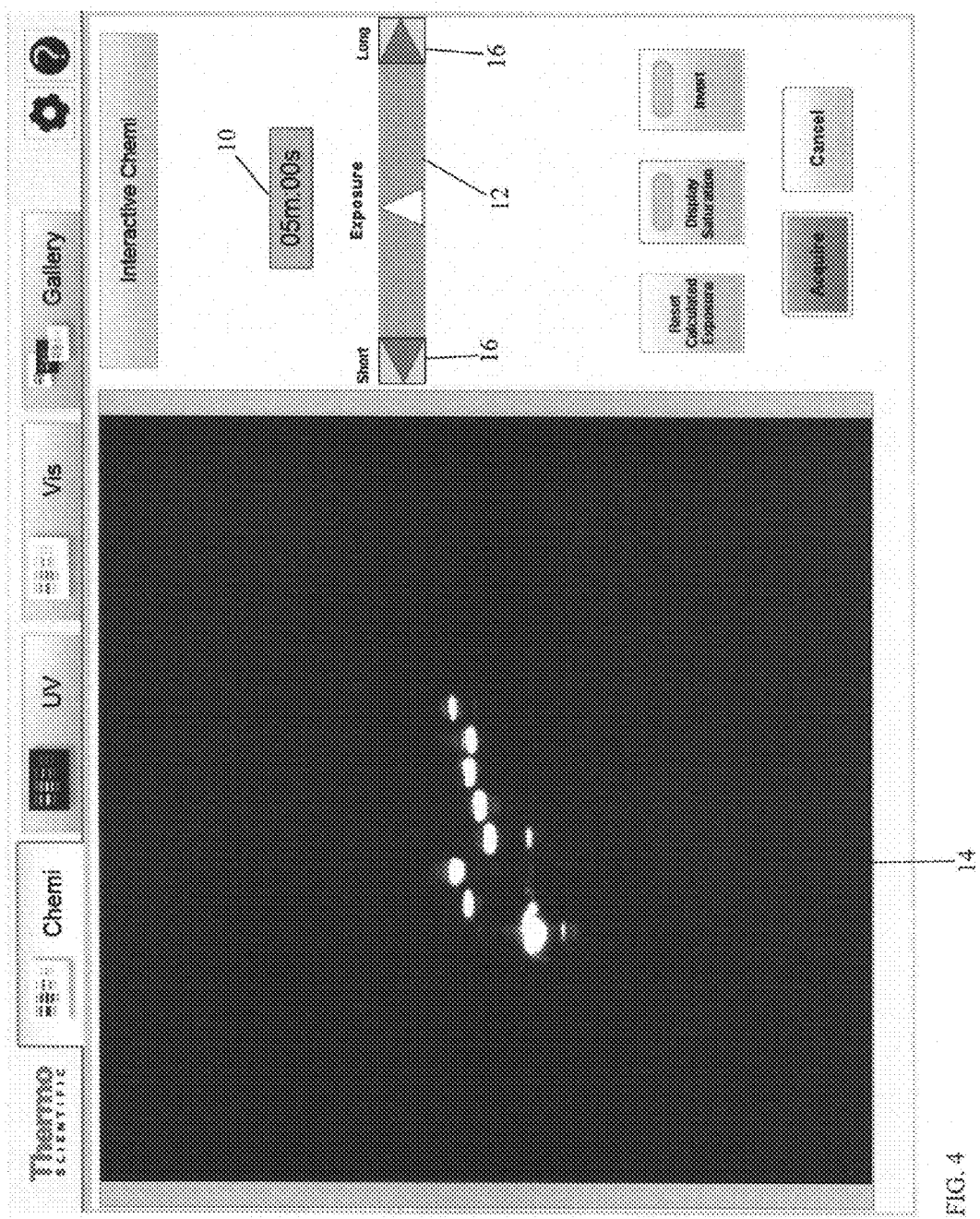
FIG. 4 is a projected image of the object of FIG. 2 at an exposure time longer than that of FIG. 3.
Figure 5:
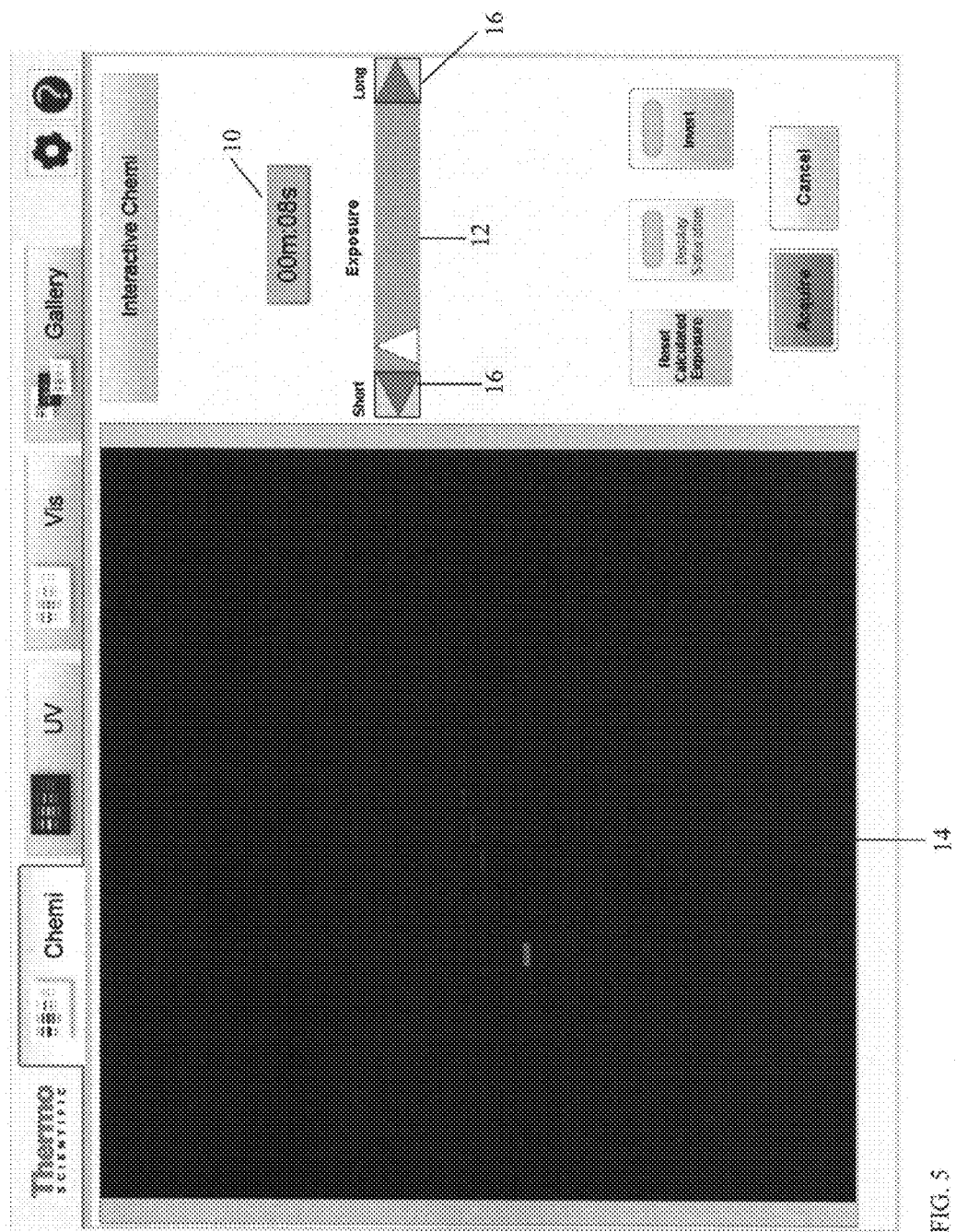
FIG. 5 is a projected image of the object of FIG. 2 at an exposure time shorter than that of FIG. 3.

Thus, while the system can generate a projected optimal exposure time, it is understood that in some cases the user/operator may desire an exposure time different from the calculated optimal exposure time, based upon the user/operator's review of the displayed projected image. FIG. 4 presents a projected image 14 where the user/operator had increased the exposure time (to 5 minutes, in the illustrated embodiment) to the point where the image 14 is overexposed. FIG. 5 presents a projected image where the user/operator had decreased the exposure time (to 8 seconds, in the illustrated embodiment) to the point where the image 14 is under-exposed.

Figure 6:
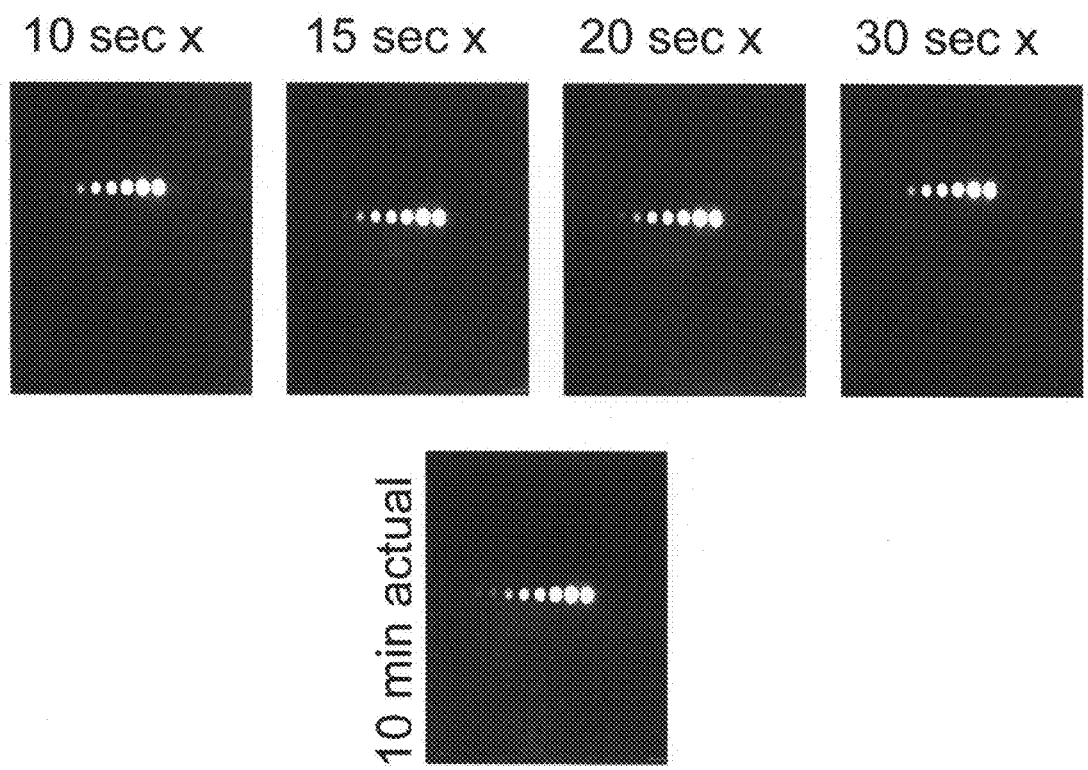
FIG. 6 shows various projected images, at a 10 minute exposure time, as compared to an actual image at a 10 minute exposure time.

The test/initial exposure time can be selected to provide an accurate baseline image for use in projecting images and/or determining optimal exposure times, while also providing convenience for the user. In particular, the longer the test/initial exposure time, the more accurate the (longer exposure time) projected image(s) will be. FIG. 6 illustrates estimated images for a ten minute exposure image, based upon test/initial exposure times of 10 seconds, 15 seconds, 20 seconds, and 30 seconds. FIG. 6 also illustrates an actual image taken at 10 minutes. As can be seen, the longer the initial exposure time (or closer to the actual exposure time), the more accurate the projected image. On the other hand, making the initial exposure time too long can take up time and resources.

The user can modify the exposure time and/or accept the projected optimal exposure time as presented by the system, to select/define the optimal/desired exposure time. Once the optimal/desired exposure time is selected/defined, an image can be acquired at the selected/defined exposure time and used for further processing. The actual image acquired at the optimal or selected exposure time will, of course, vary from the projected/preview images as outlined above. In particular, in the projected/preview images based upon the test image, the noise levels will be disproportionally increased as compared to the actual image acquired at the optimal/selected exposure time. Therefore, further noise reduction processes can be applied to create clean projected/preview images. However the system and method enables optimal exposure time to be determined/selected using, in one case, only a short, preliminary image acquisition time. The test image may not, in some cases, provide visual data to a human viewing the image, but may provide sufficient information after analysis to provide the benefits outlined above. The system and method can be used with nearly any light imaging system, but may find particular utility with detecting low light objects.

In one case, the creation and display of projected images at differing exposure times, and/or the determination of optimal exposure time, can be limited to only a certain area or portion of the test/initial image. In particular, in some cases the test/initial image may include the entire substrate or object, along with a background area. The object and background area may be present a relatively high contrast when imaged. For example, the object may be generally white or light, and the background may be generally black or dark. In this case, or in other cases where possible, it may be advantageous to distinguish the object from the background area, and apply the techniques described herein only to the object/substrate.

Figure 7:
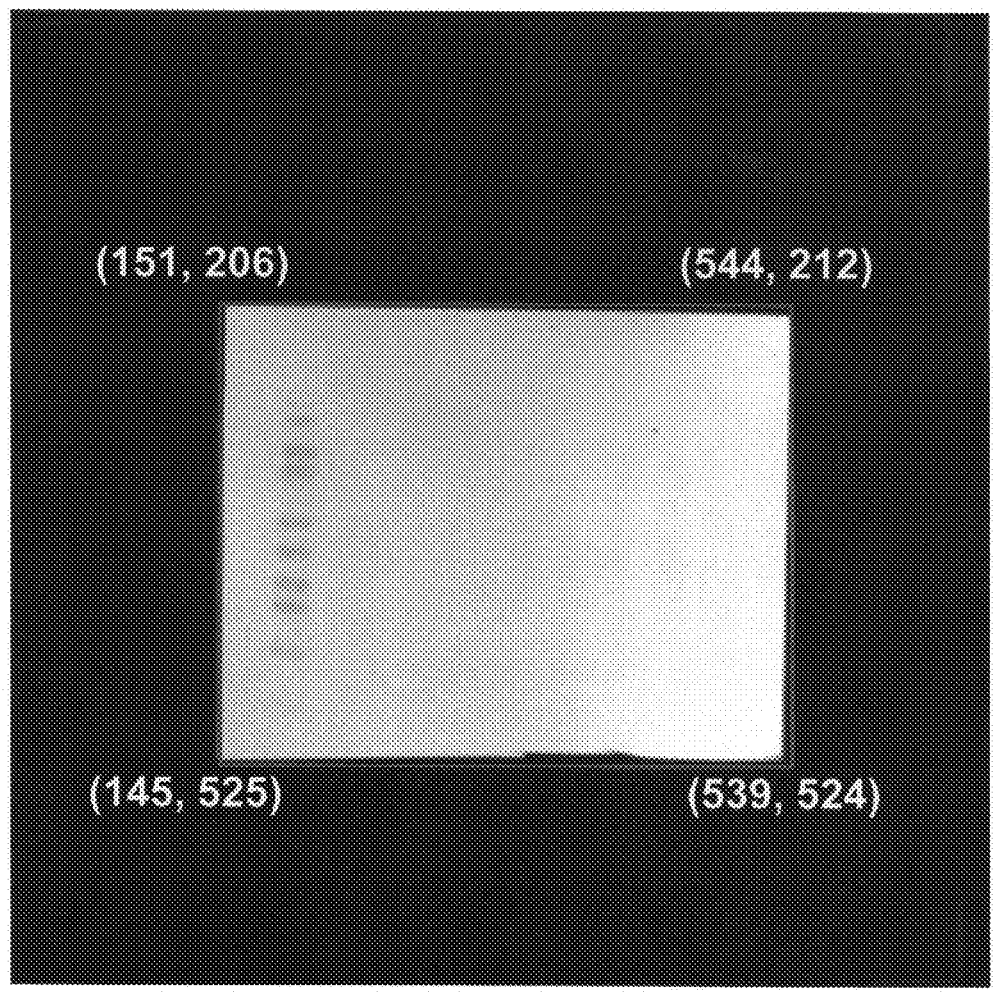
FIG. 7 shows an image of an object in front of a background.

For example, FIG. 7 shows an image of a light substrate/object in front of a dark background. After this test/initial image is acquired, the system/method may determine the outline of the object. Due to the high contrast between the object and the background of FIG. 7, any of a wide variety of edge-locating or contrast-locating algorithms may be utilized to determine the boundary between the object and background. In the illustrated embodiment the corners of the object are located using well-known corner-locating algorithms, and the edges of the object determined by projecting straight lines between the corners. Of course, the object can have various other shapes besides rectangular, in which case other suitable algorithms are utilized to determine the outer edges of the object.

Once the shape and dimensions of the object are determined, all data relating to areas outside the object can be ignored, and not form the basis for any further image projecting or optimal exposure time determinations as outlined above. For example, in one case each pixel determined to be outside the object is set to an arbitrary value (0, in one example), or each pixel simply remains at its value from the initial/test image. In either case, the exposure processing outlined above is carried out only on the image pixels determined to be on/within the object, which can significantly reduce amount of pixels to be processed. This process thereby enables more rapid calculations, providing a quicker response time and saving computing resources.

Thus, as outlined above, only a portion of the originally-acquired image, or a region of interest ("ROI"), may be utilized for the creation and display of projected images at differing exposure times, and/or the determination of optimal exposure time. In the illustrated embodiment, the entire substrate/object forms the ROI. However, the ROI can constitute various-other areas, such as particular areas of interest in the substrate/object.

Embodiments of the invention include a method, data processing system and/or computer program product. Thus, one embodiment is entirely hardware with logic embedded in circuitry, one embodiment is entirely software with logic operating on a general purpose computer to perform the method and operate the system, and/or one embodiment combines software and hardware aspects. One embodiment takes the form of a computer program product on a tangible, non-transitory computer-readable storage medium having computer readable program code means embodied in the medium. Any suitable computer readable medium may be used including hard disks, CD-ROMs, optical storage devices, static or nonvolatile memory circuitry, magnetic storage devices and the like. The executable program may be available for download from a website.

Figure 8:
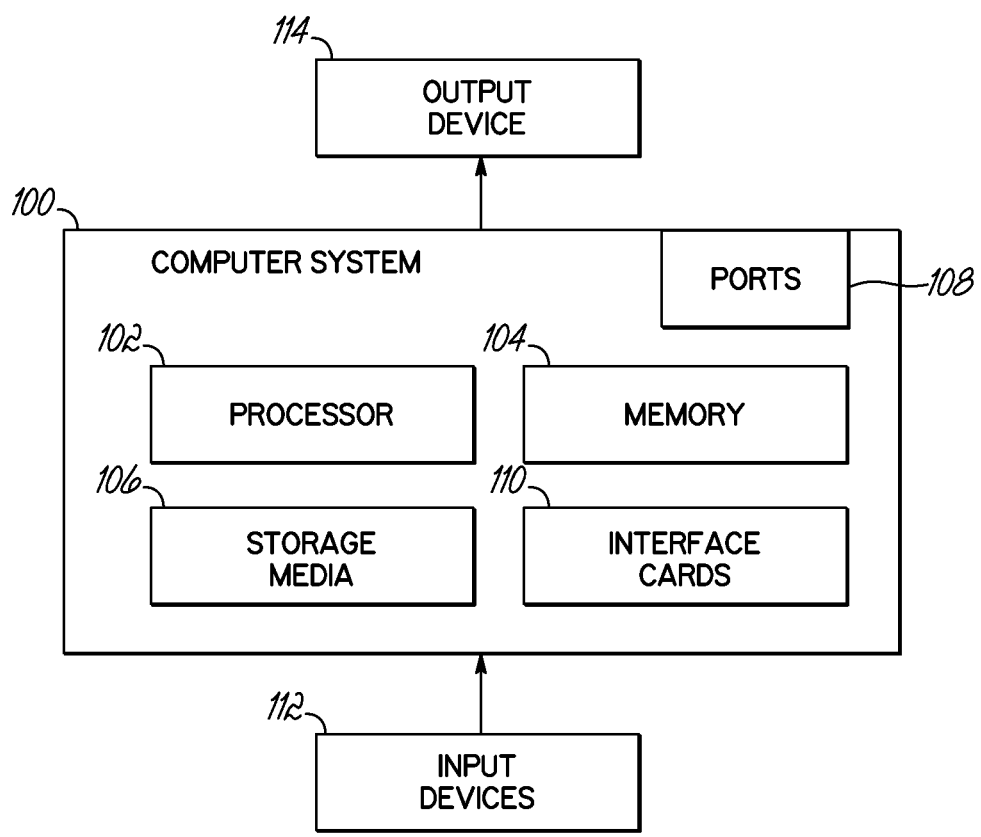
FIG. 8 schematically illustrates a general purpose computer system suitable for operating the method and system disclosed herein.

FIG. 8 shows an exemplary computer or computing system 100 that can be used to implement the method and system. The computer system 100 can be a laptop, desktop, server, handheld device (e.g., personal digital assistant (PDA), smartphone, tablet), programmable consumer electronics or programmable industrial electronics.

As illustrated the computer system 100 includes a processor 102 that can be any various available microprocessor(s). For example, the processor can be implemented as dual microprocessors, multi-core and other multiprocessor architectures. The computer system 100 includes memory 104 that can include volatile memory, nonvolatile memory or both. Nonvolatile memory can include read only memory (ROM) for storage of basic routines for transfer of information, such as during computer boot or start-up. Volatile memory can include random access memory (RAM). The computer system 100 can include storage media 106 including, but not limited to, magnetic or optical disk drives, flash memory, and memory sticks.

The computer system 100 can incorporate one or more interfaces, including ports 108 (e.g., serial, parallel, PCM-CIA, USB, FireWire) or interface cards 110 (e.g., sound, video, network, etc.) or the like. In embodiments, an interface supports wired or wireless communications. Input is received from any number of input devices 112 (e.g., keyboard, mouse, joystick, microphone, trackball, stylus, touch screen, scanner, camera, satellite dish, another computer system and the like). The computer system 100 can output data through an output device 114, such as a display (e.g. CRT, LCD, plasma), speakers, printer, another computer or any other suitable output device.

The description above references flowchart illustrations of methods, apparatus (systems) and computer program products. It will be understood that each block of the flowchart illustrations, and combinations of blocks in the flowchart illustrations, and/or part thereof, can be implemented by computer program instructions. These computer program instructions may be loaded onto a computer or other programmable data processing apparatus or otherwise encoded into a logic device to produce a machine, such that the instructions which execute on the computer or other programmable data processing apparatus create means for implementing the functions specified in the flowchart block or blocks. These computer program instructions may also be stored in a computer readable memory that can direct a computer or other programmable data processing apparatus to function in a particular manner, such that the instructions stored in the computer readable memory produce an article of manufacture including instruction means that implement the function specified in the flowchart block or blocks. The computer program instruction may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Specific functional blocks, or parts or combinations thereof, presented in relation to the disclosed methods and systems are programmable as separate modules or functional blocks of code. These modules are capable of being stored in a one or multiple-computer storage media in a distributed manner. In one embodiment, these modules are executed to perform the method and system in whole or in part on a single computer. In one embodiment, these modules are executed to perform the disclosed methods and systems on multiple computers that cooperatively execute the modules. In one embodiment, the programs are executed in a virtual environment, where physical hardware operates an abstract layer upon which the disclosed methods and systems are executed in whole or in part across one or more physical hardware platforms.

In addition, it should be understood that the system and method disclosed herein is not limited for use with imaging substrates or objects after electrophoresis, and indeed is also not limited to use in the life sciences field. Instead, the system and method can be used in nearly any imaging system in which it is desired to create a projected image and/or determine an optimal exposure time.

The embodiments described in the specification are only specific embodiments of the inventors who are skilled in the art and are not limiting. Therefore, various changes, modifications, or alterations to those embodiments may be made without departing from the spirit of the invention or the scope of the following claims.

What is claimed is:

1. A method for creating a projected image comprising:
   capturing only a single image of a biological sample with an image capture device having a plurality of light sensing units, at a first exposure time;
   analyzing the captured image of the biological sample to determine the value of pixels included in the captured image that are within a threshold level of pixel value, wherein the threshold level of pixel value is a value of a pixel that contributes to a non-saturating optimal image of the biological sample;
   determining whether the value of pixels included in the captured image that are within the threshold level of saturation, is within a threshold value of pixels, wherein the threshold value of pixels is a value of pixels that do not exceed the level of saturation of a pixel to generate a non-saturating optimal image of the biological sample;
   calculating an optimal exposure time by adjusting the first exposure time to increase the value of pixels included in the captured image linearly to have the value of a pixel that satisfies the threshold level of pixels so that the value of pixels include in the non-saturating optimal image are within the threshold level of optimal pixel value satisfying the threshold value of pixels to generate the non-saturating optimal image of the biological sample;
   creating the non-saturating optimal image with the calculated optimal exposure time to generate the projected image with the value of the pixels included in the projected image that satisfies the threshold level of pixel value; and wherein said determining step includes determining said optimal exposure time by carrying out the following steps: determining a signal intensity for each light sensing unit based upon said single captured image; determining a number or percentage of said light sensing units that exceed a first pixel value; determining a multiplier of said first exposure time which will cause said number or percentage of light sensing units to exceed a threshold pixel value; and applying said multiplier to said first exposure time to arrive at said optimal exposure time.

2. The method of claim 1, wherein each light sensing unit provides an output relating to the biological sample, and wherein the creating step includes creating the non-saturating optimal image by an algorithm based upon the output of the light sensing units.

3. The method of claim 2, wherein the creating step includes creating the non-saturating optimal image generated by the algorithm by extrapolating the output of the light sensing units.

4. The method of claim 3, wherein the extrapolating algorithm is based upon an assumption of a linear or a known non-linear relationship between the output of the light sensing units and exposure time.

5. The method of claim 1 wherein said optimal exposure time is greater than said first exposure time.

6. The method of claim 1 wherein the first exposure time is less than a minute.

7. The method of claim 1 further comprising capturing a supplemental image or data of the biological sample with the image capture device at a calculated second exposure time.

8. The method of claim 1, further comprising receiving user input of a second exposure time, and creating an algorithm generated second image of the biological sample at said user input second exposure time based upon said single captured image of the biological sample.

9. The method of claim 1, wherein the projected image is generated by algorithm, the method further comprising displaying said algorithm generated projected image.

10. The method of claim 9, further comprising:
receiving a user input exposure time, determined based upon user review of the displayed algorithm generated projected image; and
capturing a supplemental image at the user input exposure time.

11. The method of claim 1 wherein the biological sample is a substrate including electrophoretic bands thereon.

12. The method of claim 1 further comprising after the capturing step, identifying a region of interest in said single image, and wherein the creating step includes creating an algorithm generated projected image based on the exposure time calculation from only said region of interest.

13. The method of claim 12 wherein the single image comprises an item or a data, wherein the item is an object and a background, and wherein the region of interest is the object.

14. The method of claim 12 wherein the region of interest is at least partially identified by an edge-detecting algorithm.

15. The method of claim 12 wherein the region of interest is input by the user.

16. The method of claim 1 further comprising determining a second exposure time utilizing a portion of the originally-captured image, or an area of interest in the captured image at a first exposure time.

17. The method of claim 1 further comprising determining a second exposure time utilizing a user-defined portion of the image.

18. A computer program product comprising:
a non-transitory computer readable storage medium; and
instructions stored on the non-transitory computer readable storage medium that, when executed by a processor of an image capturing device having a plurality of light sensing units, cause the image capturing device to:
capture only a single initial image of a biological sample relating to an image of the biological sample at a first exposure time;
analyzing the initial image of the biological sample to determine a value of pixels included in the initial image that are within a threshold level of pixel value, wherein the threshold level of pixel value is value of a pixel that contributes to an optimal image of the biological sample;
determining whether the value of pixels included in the initial image that are within the threshold level of pixel value is within a threshold value of pixels, wherein the threshold value of pixels is a value of pixels that does not exceed the threshold level of pixel value to generate an optimal image of the biological sample;
calculating an optimal exposure time by adjusting the first exposure time to increase the value of pixels included in the initial image to have the level of pixel value that satisfies the threshold level of pixel value so that the value of pixels included in the optimal image that are within the threshold level of pixel value satisfies the threshold value of pixels to generate the optimal image of the biological sample;
creating an optimal image at the adjusted exposure time to generate the optimal image with the value of pixels included in the image that satisfy the threshold level of pixel value; and
generating a projected image that can be presented to a user or operator; and
wherein said determining step includes determining said optimal exposure time by carrying out the following steps: determining a signal intensity for each light sensing unit based upon said single captured image; determining a number or percentage of said light sensing units that exceed a first pixel value; determining a multiplier of said first exposure time which will cause said number or percentage of light sensing units to exceed a threshold pixel value; and applying said multiplier to said first exposure time to arrive at said optimal exposure time.

19. An image capture system comprising:
an image capture device having a plurality of light sensing units configured to capture only a single image a biological sample at a first exposure time; and
a computing system operatively coupled to said image capture device and configured to:
analyze the single captured image of the biological sample to determine a value of pixels included in the single captured image that are within a threshold level of pixel value, wherein the threshold level of pixel value is a value of a pixel that contributes to an optimal image of the biological sample,
determine whether the value of pixels included in the single captured image are within the threshold level of pixel value is within a threshold value of pixels, wherein the threshold value of pixels is a value of pixels that does not exceed the threshold level of pixel value to generate an optimal image of the biological sample, adjust the first exposure time to increase the value of pixels included in the single captured image to have the energy level that satisfies the threshold level of saturation so that the value of pixels included in the single captured image that are within the threshold level of saturation satisfies the threshold value of pixels to calculate an optimal exposure time, to generate the optimal image of the biological sample, create the optimal image with the calculated optimal exposure time, and generate a projected image which can be presented to a user or operator, wherein the computing system has firmware or at least one processor to execute logic instructions associated with at least one computer software program, a memory for storing logic instructions, and user interface adapted to communicate the projected image; and wherein said determining step includes determining said optimal exposure time by carrying out the following steps: determining a signal intensity for each light sensing unit based upon said single captured image; determining a number or percentage of said light sensing units that exceed a first pixel value; determining a multiplier of said first exposure time which will cause said number or percentage of light sensing units to exceed a threshold pixel value; and applying said multiplier to said first exposure time to arrive at said optimal exposure time.

* * * * *